April 29, 1952 — B. D. LEETE — 2,594,939
HALL EFFECT CONVERTER CONSTRUCTION
Filed June 6, 1950
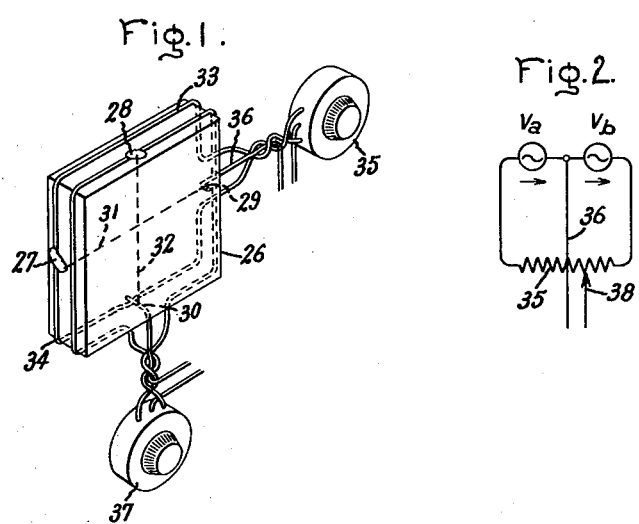
Inventor:
Bernard D. Leete,
by Russell A. Warner
His Attorney.

Patented Apr. 29, 1952

2,594,939

UNITED STATES PATENT OFFICE 2,594,939

HALL EFFECT CONVERTER CONSTRUCTION

Bernard D. Leete, Peabody, Mass., assignor to General Electric Company, a corporation of New York Application June 6, 1950, Serial No. 166,515

1 Claim. (Cl. 321—45)

My invention relates to "Hall effect" converter construction and, more particularly, to a wiring arrangement for eliminating induced voltages in the lead wires connected to a "Hall effect" plate employed in converters such as described in U. S. Patent 2,464,807 of Albert Hansen, Jr., assigned to the assignee of the present invention.

The aforementioned patent utilizes a phenomenon known as the "Hall effect" to generate an alternating voltage having an amplitude dependent upon a direct current. In employing this phenomenon, a thin semi-conductor plate, such, for example, as germanium, is disposed in an alternating magnetic field such that the field is perpendicular to the face of the plate. A direct current is passed longitudinally through the plate perpendicular to the magnetic field and a voltage is developed between points in the plate which lie along a line mutually perpendicular to the path of the current and to the direction of the magnetic field. The intensity of the magnetic field is varied according to a sine wave with respect to time, and the amplitude of the sine wave of voltage developed is related to the magnitude of the direct current. Consequently, a direct current may be converted to an alternating voltage having an amplitude dependent upon the magnitude of the direct current and having a frequency equal to the frequency of the changing magnetic field.

In a practical application of this converter, a difficulty is encountered in that voltages are induced in the lead wires connecting a direct current source to the plate, and also in the lead wires connecting the alternating voltage to a useful signal translating stage. These induced voltages having the frequency of the alternating magnetic field and, hence, having the same frequency as the generated alternating voltage cannot be filtered out in the signal translating stages. Consequently, these induced voltages should be minimized in the converter for most applications. A pivoted conductor located in the air gap of the magnetic field producing means, such as described in the heretofore mentioned patent, provides means for compensating for these induced voltages, but has the disadvantage of necessitating a longer air gap and, hence, a greater amount of power to produce the magnetic field.

It is, therefore, an object of my invention to provide an improved wiring arrangement for a "Hall effect" converter in which these induced voltages are minimized.

In the attainment of the foregoing object, I provide a wiring arrangement in which the lead wires to a "Hall effect" plate are so arranged within the magnetic field that the voltage magnetically induced in one portion of the lead wire is small and is compensated for by a voltage magnetically induced in another portion of the lead wire. Consequently, any voltage induced in these wires by the magnetic field is balanced out and, therefore, does not appear in the output voltage of the converter.

For additional objects and advantages, and for a better understanding of my invention, attention is now directed to the following description and accompanying drawing in which the features of my invention believed to be novel are particularly pointed out, in which Fig. 1 is a preferred embodiment of my invention; and Fig. 2 is a schematic electric diagram suitable to the arrangement of Fig. 1.

Referring to Fig. 1, a thin "Hall effect" disk 26 having a magnetic field passing perpendicularly to the face of the plate has mounted on opposite sides thereof terminals 27, 28, 29, and 30. A dotted line 31 between terminals 27 and 29 represents the path of average current in plate 26 between terminals 27 and 29, and dotted line 32 represents the path of average current between terminals 28 and 30 through plate 26. A lead 33 and a lead 34 are connected between terminal 27 and the end terminals of a variable three-terminal resistor 35. Terminal 29 is connected by a lead 36 to an external circuit. A variable resistor 37 is similarly connected to terminals 28 and 30. Considering terminals 27 and 29 and its associated potentiometer and lead wires, an alternating magnetic field induces a voltage in the loop composed of conductor 33 and current path 31, and another voltage is developed in the loop comprising conductor 34 and current path 31. As shown in Fig. 2, the voltages in each loop, $V_a$ and $V_b$, establish opposite currents in conductor 36 which, by the proper adjustment of variable tap 38, may be balanced out. This embodiment has the advantage that it may be used with laminated core electromagnets, and, because the lead wires do not extend over the face of the disk, the gap between the magnet poles may be made very small, thus reducing the power required to operate the magnet.

While this invention has been described by particular embodiments thereof, it will be understood that those skilled in the art may make many changes and modifications without departing from my invention. Therefore, by the appended claim, I intend to cover all such changes and modifications which fall within the true spirit and scope of this invention.

What I claim as new and desire to secure by Letters Patent of the United States is:

In combination, a magnetic field producing means comprising a core of magnetic material having a pair of poles separated by an air gap and means for alternately magnetizing said core in opposite directions, a semi-conductor Hall plate having first and second mutually transverse axes and being disposed in said air gap such that the magnetic field located between said poles is in a direction perpendicular to each of said axes, a pair of conductors located on opposite sides of said plate and electrically connected to one extremity of said first transverse axis such that said conductors lie external to said plate and said poles on opposite sides of said plate, a potentiometer being located on a line coinciding with said first axis, the position of said potentiometer being beyond the other extremity of said first axis, said conductors being connected to opposite ends of said potentiometer, and external circuit conductors connected to the other said extremity of said first axis and to an adjustable point on said potentiometer.

BERNARD D. LEETE.

REFERENCES CITED

The following references are of record in the file of this patent:

UNITED STATES PATENTS

| Number | Name | Date |
| --- | --- | --- |
| 1,892,826 | Bettison et al. | Jan. 3, 1933 |
| 2,008,857 | Flanders | July 23, 1935 |
| 2,373,601 | Robinson | Apr. 10, 1945 |
| 2,464,807 | Hansen | Mar. 22, 1949 |